(12) United States Patent
Zhang et al.

(10) Patent No.: US 8,006,716 B2
(45) Date of Patent: Aug. 30, 2011

(54) PARENT-SUBSIDIARY GUIDE FLOAT VALVE

(75) Inventors: Zhibing Zhang, Nanjing (CN); Zheng Zhou, Nanjing (CN); Yinchun Liang, Nanjing (CN); Baorong Wang, Nanjing (CN)

(73) Assignee: Nanjing Universtiy (CN)

( * ) Notice: Subject to any disclaimer, the term of this patent is extended or adjusted under 35 U.S.C. 154(b) by 918 days.

(21) Appl. No.: 11/571,941

(22) PCT Filed: Jul. 11, 2005

(86) PCT No.: PCT/CN2005/001012
§ 371 (c)(1),
(2), (4) Date: Jan. 11, 2007

(87) PCT Pub. No.: WO2006/007783
PCT Pub. Date: Jan. 26, 2006

(65) Prior Publication Data
US 2007/0227595 A1   Oct. 4, 2007

(30) Foreign Application Priority Data
Jul. 19, 2004 (CN) .......................... 2004 1 0041416

(51) Int. Cl.
*F16K 21/04* (2006.01)
*F02M 29/04* (2006.01)
(52) U.S. Cl. ................ 137/512.2; 261/114.4
(58) Field of Classification Search ............... 137/512.2; 261/114.4
See application file for complete search history.

(56) References Cited

U.S. PATENT DOCUMENTS

| | | | | | |
|---|---|---|---|---|---|
| 3,019,003 | A | * | 1/1962 | Glitsch ..................... | 261/114.4 |
| 3,146,280 | A | * | 8/1964 | Forgrieve .................. | 261/114.4 |
| 3,427,007 | A | * | 2/1969 | Vlastimil .................. | 261/114.4 |
| 3,618,912 | A | * | 11/1971 | Braun et al. ............. | 261/114.4 |
| 3,693,948 | A | * | 9/1972 | Kloss ........................ | 261/114.4 |
| 3,759,494 | A | * | 9/1973 | Axelrod et al. ........... | 261/114.4 |
| 3,770,255 | A | * | 11/1973 | Nutter ....................... | 261/114.4 |
| 3,815,880 | A | * | 6/1974 | Price ......................... | 261/114.4 |
| 4,225,541 | A | * | 9/1980 | Vaschuk et al. .......... | 261/114.4 |
| 5,120,474 | A | * | 6/1992 | Binkley et al. ........... | 261/114.4 |
| 6,053,485 | A | * | 4/2000 | Pan et al. .................. | 261/114.4 |
| 6,145,816 | A | * | 11/2000 | Chuang et al. ........... | 261/114.4 |
| 6,799,752 | B2 | * | 10/2004 | Wu et al. ................... | 261/114.4 |

FOREIGN PATENT DOCUMENTS

| | | |
|---|---|---|
| CN | 2191699 Y | 3/1995 |
| CN | 2284092 Y | 6/1998 |
| CN | 2368584 Y | 3/2000 |
| CN | 1389287 A | 1/2003 |

* cited by examiner

*Primary Examiner* — Stephen M Hepperle
*Assistant Examiner* — Craig Price
(74) *Attorney, Agent, or Firm* — Schmeiser, Olsen & Watts, LLP

(57) ABSTRACT

A floating valve providing a parent-and-subsidiary flow-guided floating valve of low pressure drop, high throughput and highly flexible operation maintaining high efficiency within a wide range of gaseous load changes is disclosed. Furthermore, a parent-and-subsidiary flow-guided floating valve having at least two legs, wherein the body of the parent valve is a symmetrical plane figure with the central axis line as the symmetrical line, the central axis line to the overflow cofferdam along the direction in which the liquid flows is also provided.

4 Claims, 5 Drawing Sheets

PARENT-SUBSIDIARY GUIDE FLOAT VALVE

TECHNICAL FIELD

The present invention relates to the core component of a floating valve tray-floating valve.

BACKGROUND OF THE INVENTION

One of the most important industrial technologies in the world presently is the tower separation technology. Tower separation technology is widely used in such fields as petrol-oil, chemical, pharmacy, spice, etc. Among various separating towers, the floating valve tower is widely favored due to excellent comprehensive performance. At present, floating valves are more frequently used for industrial applications, including F1 floating valve, rectangle-shaped floating valve, diamond-shaped valve, etc. These floating valves may be characterized by low pressure drop, high throughput, and highly flexible operation, etc. With the development of the global economy, people tend to have higher requirements for separation of chemical mixtures and the performance of separating equipment. For instance, with respect to a refining device, people hope that one tower can handle crude oils of multiple sources. This not only requires the separating tower equipment to have low pressure drop, high throughput and highly flexible operation, but also requires it to be able to maintain high separation efficiency within a wide range of gaseous load changes.

SUMMARY OF THE INVENTION

The present invention is a brand new flow-guided floating valve. The objective of this invention is to provide a parent-and-subsidiary flow-guided floating valve of low pressure drop, high throughput and highly flexible operation that can maintain high efficiency within a wide range of gaseous load changes.

One aspect of the present invention may include a parent-and-subsidiary flow-guided floating valve, comprising the body of the parent valve (A) being a symmetrical plane figure with the central axis line as the symmetrical line, the central axis line pointing to the overflow cofferdam along the direction in which the liquid flows and there are at least 2 legs below the body of the parent valve, with the front leg (A-1) being longer than the rear leg (A-2) so that a 2-10 degree angle opens between the body of the parent valve and the valve orifice toward the overflow cofferdam when the parent valve is fully open, wherein the body of the parent valve is a parent valve hole (A-5), on which is the subsidiary valve (B), which is a movable valve smaller than the parent valve in terms of area with its circumference parallel to that of the parent valve and there are at least 2 legs under the body of the subsidiary valve and the front leg (B-1) is equal to or longer than the rear leg (B-2) so that a 0-10 degree angle opens between the body of the subsidiary valve and the body of the parent valve toward the overflow cofferdam when the subsidiary valve is fully open.

A second aspect of the present invention may include a parent-and-subsidiary flow-guided floating valve, wherein the body of the parent valve is a round, polygon or streamline shape with the central axis line as the symmetrical line, the central axis line points to the overflow cofferdam along the direction in which the liquid flows and there are at least 2-4 (generally 3-3) around the valve body. The front leg is longer than the rear leg. When the parent valve is fully open, a 2-10 angle opens between the body of the parent valve and the valve orifice toward the overflow cofferdam and on the body of the parent valve is a subsidiary valve hole, in which is the subsidiary valve, which is also a movable valve in the polygon or round shape and smaller than the parent valve in terms of area. There are at least 2 (generally 2-3) valves around the body of the subsidiary floating valve. The front leg of the subsidiary valve is of equal length to or longer than the rear legs of the subsidiary valve. When the subsidiary floating valve is fully open, a 0-10 degree angle opens between the subsidiary valve and the parent valve toward the overflow cofferdam.

BRIEF DESCRIPTION OF THE DRAWINGS

Some of the embodiments of this invention will be described in detail, with reference to the following figures, wherein like designations denote like members wherein.

DETAILED DESCRIPTION OF THE DRAWINGS

The invention is further described through the embodiments and with reference to the figures.

Figure 1:
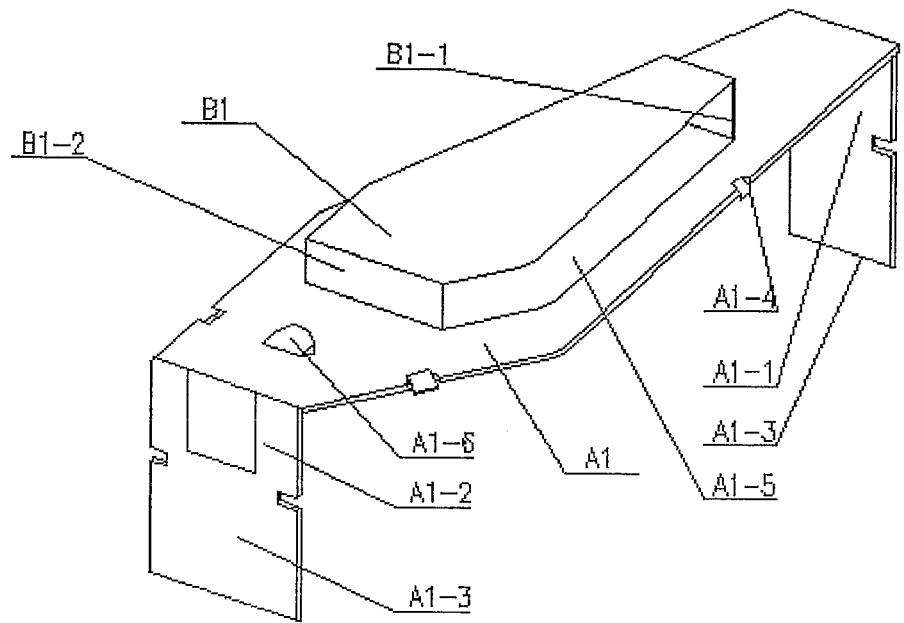
FIG. 1 shows the 3D structure schematic of the diamond-shaped parent-and-subsidiary flow-guided floating valve.
Figure 1A:
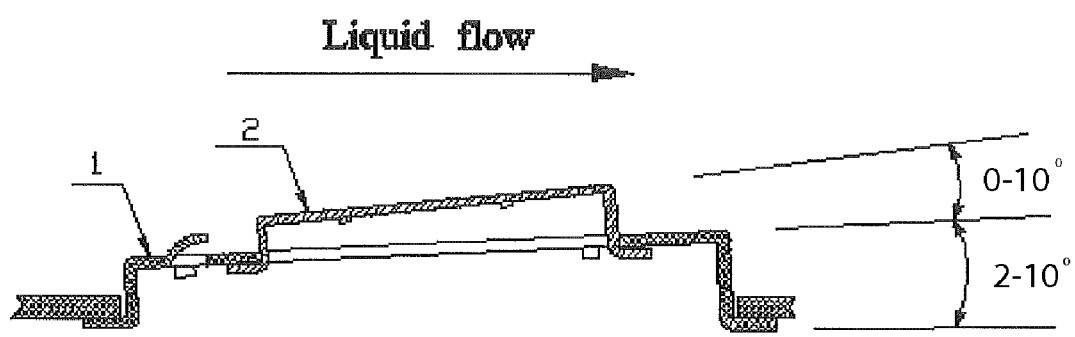
FIG. 1A depicts an side, cross-sectional view of an embodiment of the floating valve fully open, having an angle of 2~10° and an angle of 0~10°.

Referring to FIGS. 1-6, a parent-and-subsidiary flow-guided floating valve, wherein the body of the parent valve is a round, polygon or streamline shape with the central axis line as the symmetrical line, the central axis line points to the overflow cofferdam along the direction in which the liquid flows is shown. There may be at least 2-4 (generally 3-3) around the valve body. The front leg is longer than the rear leg. When the parent valve is fully open, a 2-10° angle opens between the body of the parent valve and the valve orifice toward the overflow cofferdam. On the body of the parent valve is a subsidiary valve hole, which may also be known as the subsidiary valve, and may also be a movable valve having a polygon or round shape, and may be smaller than the parent valve in terms of area, perimeter, etc. There are at least 2 (generally 2-3) valves around the body of the subsidiary floating valve. The front leg of the subsidiary valve is of equal length to or longer than the rear legs of the subsidiary valve. With reference to FIG. 1A, when the subsidiary floating valve is fully open, a 0-10 degree angle opens between the subsidiary valve and the parent valve toward the overflow cofferdam. For instance, parent-and-subsidiary flow-guided floating valve, the subsidiary valve and the parent valve may or may not have similar shapes.

Figure 1B:
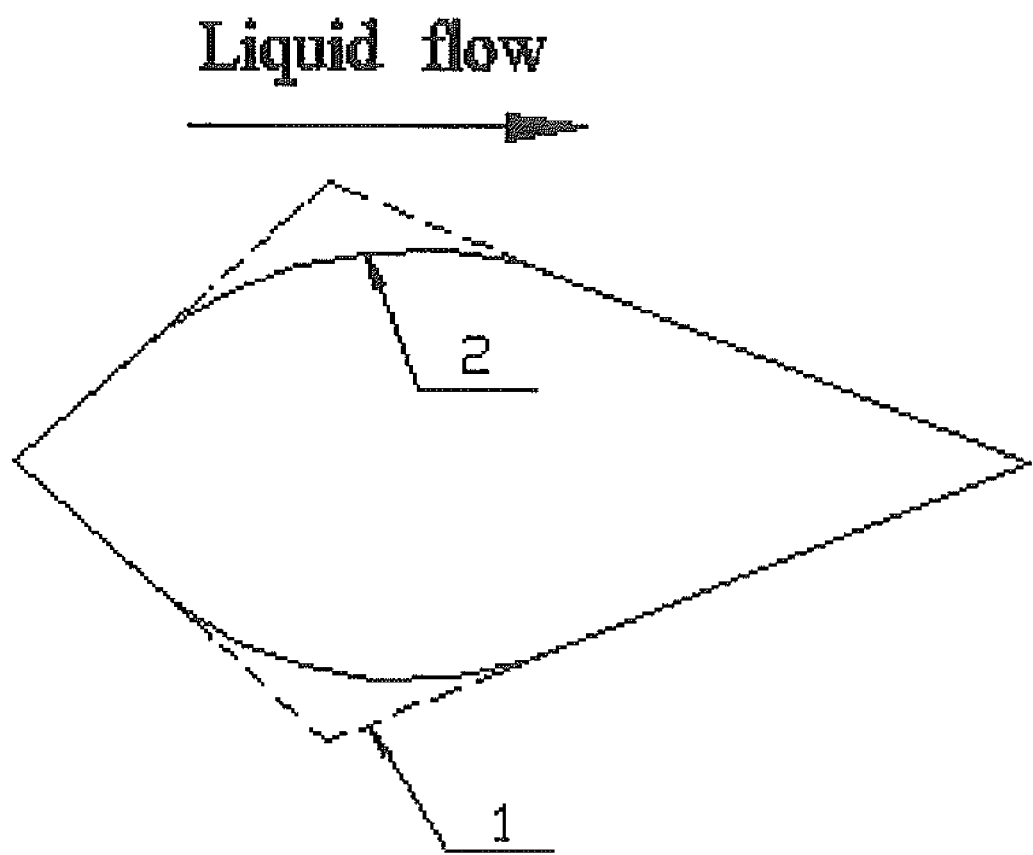
FIG. 1B depicts a top view of an embodiment of a valve plate, in which polygon vertex angle 1 and arc 2 are shown.

Referring now to FIG. 1B, and the parent-and-subsidiary guide floating valve of the present invention, the polygon top angle between the body of the parent floating valve and that of the subsidiary floating valve is in an arc shape so that the body of the body of the parent floating valve and that of the subsidiary floating valve appear to be in the streamline shape along the direction in which the liquid flows. For example, the area of the body of the subsidiary valve may be 30~60% that of the body of the parent valve.

Additionally, it is possible to make a guide opening on the body of the parent valve behind the subsidiary valve, out of which the air guided flows in the same direction as the liquid flow, therefore driving forward accelerated flow of the liquid, which is helpful in reducing the liquid surface gradient on the tower. Whether the guide hole will be provided or not depends on the actual working conditions. Said parent-and-subsidiary flow-guided floating valve may be made of various metal materials or composite materials of metal materials and non-metallic materials when necessary to meet the requirements of different working conditions.

The body of the parent valve and subsidiary valve of said parent-and-subsidiary flow-guided floating valve of this invention may have a round, polygon or streamline shape, among which the polygon shape mainly includes triangle, quadrangle (bar, rectangle, trapezoid, etc.) and diamond. During the production process, the shape of the parent-and-subsidiary flow-guided floating valve shall be determined with due consideration given to the performance of the floating valve, difficulty in processing and maintenance, costs and other factors.

The parent-and-subsidiary guide floating valve of this invention has the following advantages:

(1). When the air speed is small, the parent floating valve remains standstill on the tray and the subsidiary floating valve rises. Now the gas-liquid mass transfer is mainly under the action of the subsidiary floating valve, for instance, as the gaseous load increases, the subsidiary floating valve is fully opened and the parent floating valve is also lifted open due to sufficient pressure and enters the operating state. The rising gaseous phase enters the liquid layer through the space of the rising parent subsidiary valve leaf. Thus, the whole rate of the tower and the air speed of the valve hole can be adjusted effectively within a wide range, enabling very high operation flexibility. Experiments have shown that operation flexibility of the diamond-shaped parent-and-subsidiary flow-guided floating valve tray runs up to 8:1 and maintains high efficiency at low air speed with the efficiency basically remaining unchanged without significant fluctuations as the throughput increases.

Moreover, the parent-and-subsidiary flow-guided floating valve provides much larger air flow passageway and contact area between the gaseous phase and the liquid phase than the other types of single-layer valves. The handling capacity and efficiency of the tray are increased significantly. It shall be specially noted that the parent-and-subsidiary flow-guided floating valve has the characteristic of high efficiency under high gaseous load. Take the diamond-shaped parent-and-subsidiary flow-guided floating valve for example, experiments and tests have shown that empty tower gaseous power factor, F, of the diamond-shaped parent-and-subsidiary flow-guided floating valve may reach more than 4.0, while the efficiency of the oxygen resolved Murphree liquid phase plate stills runs up to more than 90%.

(3). The subsidiary floating valve is generally a miniature specially designed after the shape of the parent valve; generally, its folding line or edge of the arc is parallel to the folding line or edge of arc of the parent floating valve so that the mass transfer space on top of the parent floating valve can be divided uniformly, leading to more fine and uniform gas dispersion and adequate gas liquid contact.

(4). The parent, subsidiary floating valve are generally of a symmetrical shape, which may guide the liquid flow properly and drive the liquid forward, therefore effectively reducing the gradient of the liquid surface and the back mixing extent of the liquid.

(5). A guide hole may or may not be provided on the body of the parent floating valve behind the subsidiary valve. After the guide hole is provided, it is possible to offset the backward air flow spraying from the gap of the subsidiary valve partially so as to exert greater forward pushing force on the liquid flow.

(6). The front legs of the parent-and-subsidiary floating valve is longer than the rear legs of the parent-and-subsidiary floating valve so that the valve leaf forms a certain angle with the horizontal surface of the tower as the valve leaf is fully opened. As such, the air flow quantity in the front of the valve leaf shall be larger than that at its rear and the overall effect is that the liquid is pushed to move forward, effectively eliminating the liquid phase gradient on the tower.

In a first embodiment, an Ethanol-water rectifying tower has a diameter, Φ, of 1200 mm and 36 layers of trays with hole rate of 11.5% and the all original towers are type F1 floating valves. All trays are changed into diamond-shaped parent-and-subsidiary flow-guided floating valve trays of this invention. Referring again to FIG. 1, the parent floating valve is 100 mm in body A1 length, 65 mm in front end length, 35 mm in rear end length, 45 mm in maximum width and the guide hole on the body of the A1-6 is shaped like a tongue, being 2 mm in height. The front leg A1-1 is 8 mm in width and 14 mm in length, while the rear leg A1-2 is 12 mm in width and 11 mm in length. The subsidiary floating valve may be a symmetrical quadrilateral floating valve, having a length of 60 mm for valve leaf B1, 45 mm in front length, 15 mm in rear length, and 25 mm in maximum width. The front leg B1-1 is 5 mm in width and 7 mm in length; the rear leg B1-2 is 6 mm in width and 6 mm in length. The fastening piece of the original tray is preserved in the modification and only the tray is changed. Production calibration is carried out after the modification. It can be learned from the calibration result that after using the diamond-shaped parent-and-subsidiary flow-guided float valve tray of this invention, the purity of ethanol increases from 94.1% wt to 94.9% wt, indicating that the plate efficiency of the parent-and-subsidiary flow-guided floating valve is higher than that of type F1 floating valve. From production practice, the handling capacity increases by 46% and the production operation is stable. In addition, the operation flexibility increases from 2.5:1 before the modification to 4.5:1, indicating that the parent-and-subsidiary flow-guided floating valve of this invention not only offers high throughput & efficiency, but also offers high flexibility in operation.

Figure 6:
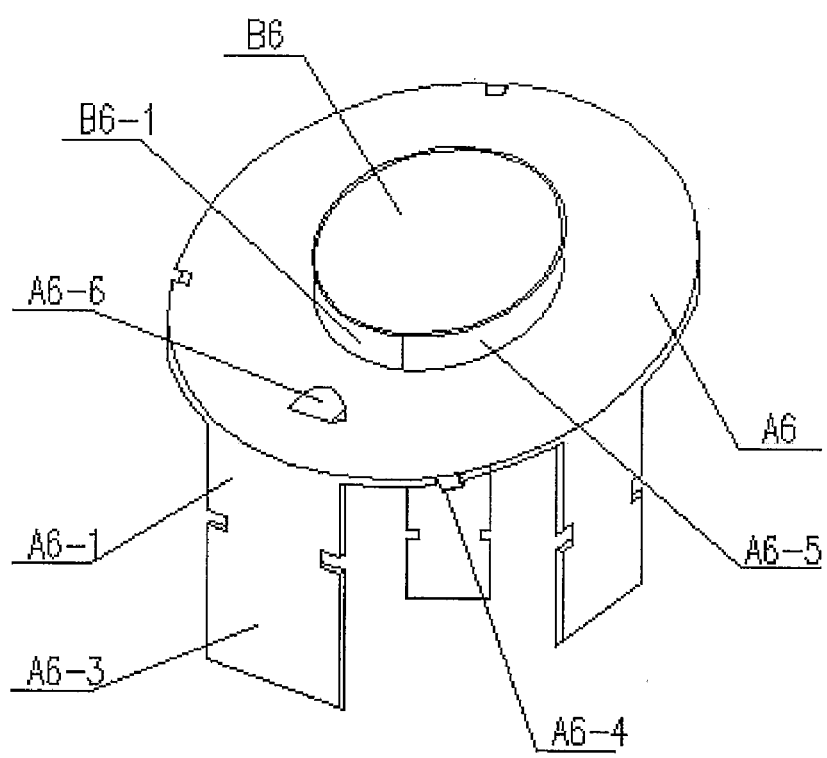
FIG. 6 shows the 3D structure schematic of the round parent-and-subsidiary flow-guided floating valve.

In a second embodiment, Methanol-water rectifying system is originally a common sieve plate tray. The operation of the equipment has been abnormal since it is put into operation, which is manifested as low production load, which can reach only 90% of the original design load (the designed maximum handling capacity is 12 t/d) and unacceptable methanol at the tower top (≦99.9% wt) as long as there is any fluctuation in the working operations and load. The original tower has 88 layers of sieve plates with a hole rate of 12% and plate-to-plate distance of 450 mm. After using the technology of this invention, the tower remains an 88-layer tower with a whole rate of 14% and plate-to-plate distance of 450 mm. All towers are changed into the round flow-guided floating valve tray of this invention. As shown in FIG. 6, the body of the parent floating valve A6 is 50 mm in diameter and the guide hole on the body of the parent floating valve A6-6 is shaped like a tongue and 3 mm in height. It has 3 valves in total: the front leg A6-1 is 10 mm in width and 14 mm in length and the 2 rear legs are 10 mm in width and 12 mm in length. The body of the subsidiary floating valve B6 has a diameter of 30 mm.

It also has 3 legs: the front leg B6-1 is 5 mm in width and 7 mm in length and the rear legs B6-2 are 5 mm in width and 6 mm in length. After entering into operation, the maximum operation load of the tray is 1.82 times that of the original maximum load and the minimum load is 60% of the original minimum load. The purity of the product at the tower top—methanol can be maintained above 99.95% wt.

Figure 4:
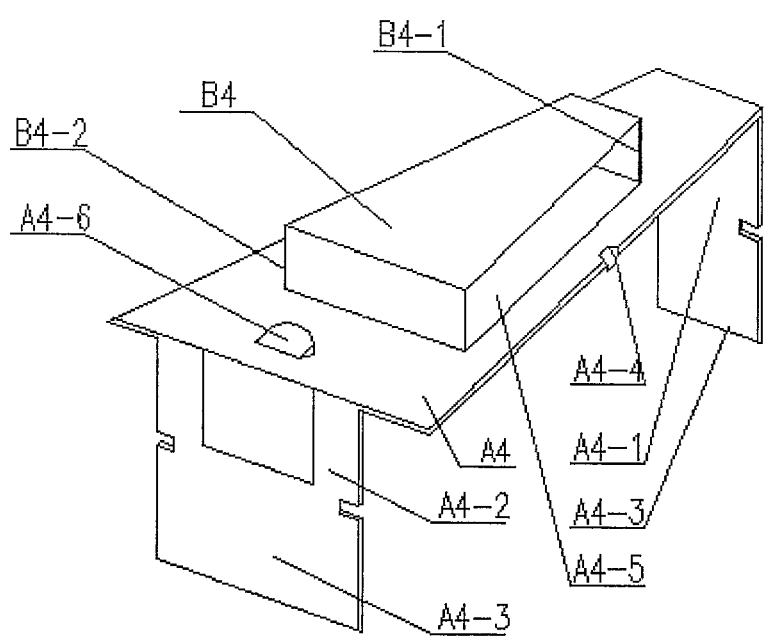
FIG. 4 shows the 3D structure schematic of the trapezoidal parent-and-subsidiary flow-guided floating valve.

In a third embodiment, Epoxypropane (PO)—water rectifying system with handling capacity of 20000 t/a=2500 kg/h (calculated based on a year of 330 days) is described. The trapezoidal parent-and-subsidiary flow-guided floating valve tray of this invention is used to modify the original type F1 floating valve tray, which has a tower diameter of Φ 1300 mm, 50 trays with plate-to-plate distance of 400 mm, utilizes the material of stainless steel and is arranged in a crossed manner. As shown in FIG. 4, the parent floating valve is 80 mm in body A4 length, 30 mm in front edge length and 50 mm in rear edge length and the guide hole on the body of the parent valve A4-6 is shaped like a tongue and is 2 mm in height. The parent floating valve has two legs: the front leg A4-1 is 8 mm in width and 15 mm in length, while the rear leg A4-2 is 12 mm in width and 13 mm in length. The body of the subsidiary floating valve B4 has a trapezoidal shape similar to that of the parent valve and it is 45 mm in valve leaf length, 15 mm in front edge length and 30 mm in rear edge length; its front leg B4-1 is 5 mm in width and 7 mm in length, while its rear leg B4-2 is 6 mm in width and 6 mm in length. After calibration and verification following modification, the handling capacity increases to 28500 t/a, the operation backflow decreases from original R=3.3 to R=3.15 and the steam consumption of one ton of products decreases by 4.6%. The operation results indicate that the handling capacity of the tower increases by 42.5% than type F1 floating valve and the purity of PO at the tower top rises from 99.8% wt to 99.92% wt.

Figure 3:
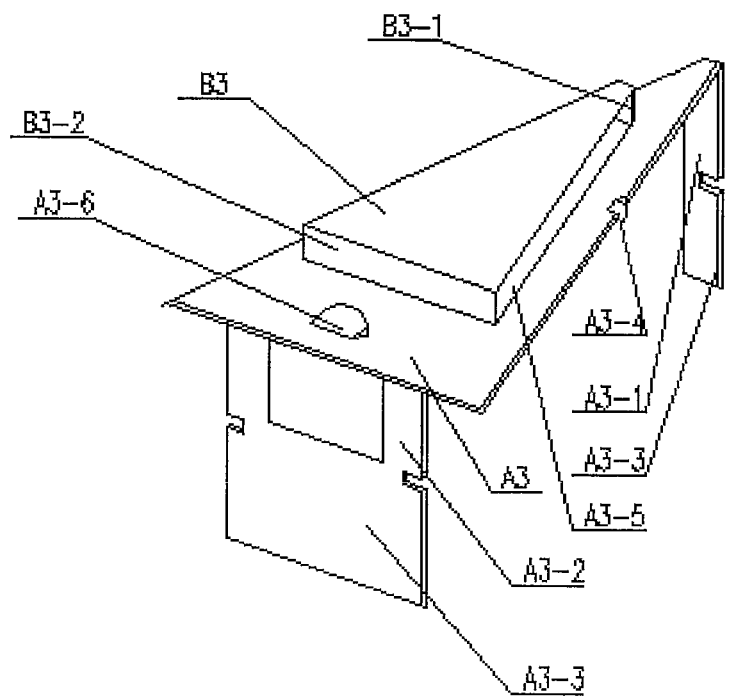
FIG. 3 shows the 3D structure schematic of the triangular parent-and-subsidiary flow-guided floating valve.

In a fourth embodiment, a Dichloromethane rectifying tower is described. With original design handling capacity of 40000 t/a and diameter of Φ 1800 mm, the original tower is a sieve plate tray with plate-to-plate distance of 400 mm, hole rate of 12% and 160 trays. Due to increased output and requirements for energy saving, the equilateral triangle parent-and-subsidiary flow-guided floating valve tray of this invention is adopted. As shown in FIG. 3, it specific structure parameters are: the edge of the body of the parent floating valve A3 is 60 mm in length and the parent floating valve has 3 legs: one front leg and two rear legs; the front leg A3-1 is 14 mm in length and 10 mm in width, while the rear legs A3-2 are 12 mm in length and 12 mm in width. The subsidiary valve B3 is 30 mm in edge length and also has 3 legs: one front leg and two rear legs. The front leg B3-1 is 10 mm in length and 8 mm in width; the rear legs B3-2 are 8 mm in length and 8 mm in width. The hole rate is 13%. The operation results after modification indicate that the purity of product at the tower top—dichloromethane increases from original 99.95% wt to 99.98% wt., the temperature at the bottom of the tower drops by 3.2° C., the handling capacity increases to 55800 t/a, which is equivalent to a increase of 39.5%, and the operation flexibility changes from original 2.2:1 to 4.3:1. In addition, the pressure of the whole tower decreases by 640 Pa.

Figure 2:
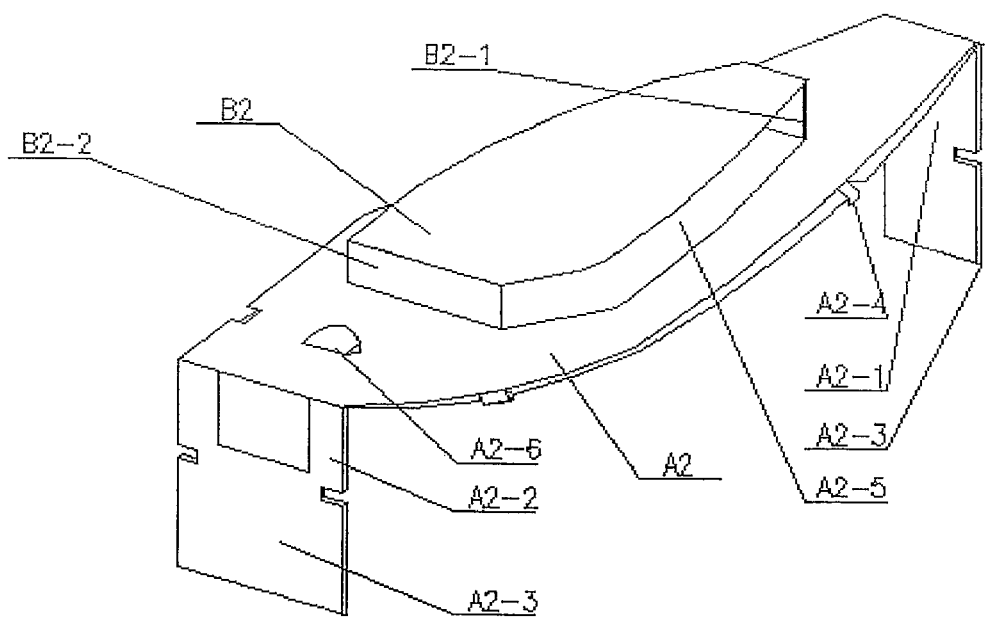
FIG. 2 shows the 3D structure schematic of the streamline parent-and-subsidiary flow-guided floating valve.

In a fifth embodiment, a streamline parent-and-subsidiary flow-guided floating valve tray of this invention is applied to the rectifying tower similar to that in the first embodiment. As shown in FIG. 2, the parent floating valve is 90 mm in body A2 length, 60 mm in front end length, 30 mm in rear end length and 40 mm in maximum width and the guide hole on the body of the parent floating valve A2-6 is shaped like a tongue 2 mm in height. The parent floating valve has 2 legs: the front leg A2-1 is 8 mm in width and 16 mm in length, while the rear leg A2-2 is 12 mm in width and 13 mm in length. The body of the subsidiary valve B2 has a streamline shape similar to that of the parent valve; the subsidiary valve is 45 mm in length, 30 mm in front end length, 15 mm in rear end length and 20 mm in maximum width; the front leg B2-1 is 5 mm in width and 7 mm in length, while the rear leg B2-2 is 5 mm in width and 6 mm in length. The results of production operation indicate that the purity of the products increases from 94.6% to 95.0%, the handling capacity increases by 46% than before modification and the operation flexibility increases from original 2.2:1 to 4:1.

Figure 5:
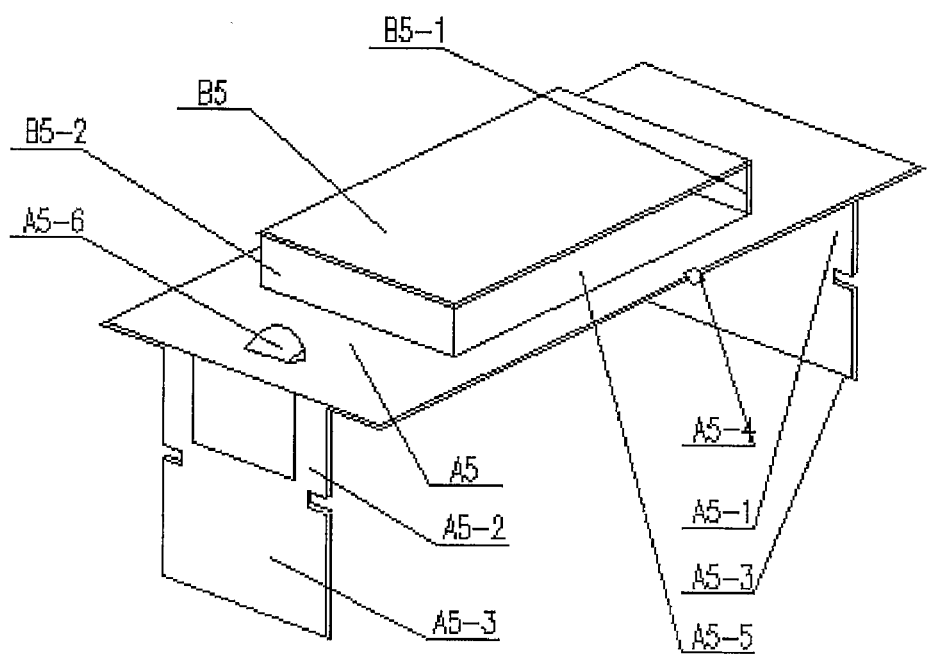
FIG. 5 shows the 3D structure schematic of the bar parent-and-subsidiary flow-guided floating valve.

In a sixth embodiment, with reference to FIG. 5, the rectangular (bar) parent-and-subsidiary flow-guided floating valve tray of this invention is applied to the rectifying tower similar to that of embodiment three. The body of the parent floating valve A5 is 80 mm in length and 40 mm in width. The parent floating valve has 2 legs: the front leg A5-1 is 10 mm in width and 15 mm in length, while the rear leg A5-2 is 10 mm in width and 12 mm in length. The body of the subsidiary valve has a rectangular shape similar to that of the body of the parent floating valve. The body of the subsidiary valve is 40 mm in length and 20 mm in width; the front leg B5-1 is 8 mm in width and 12 mm in length, while the rear leg B5-2 is 8 mm in width and 10 mm in length. The operation results after modification indicate that the handling capacity increases by 36% than type F1 floating valve and the energy consumption decreases by 3.5%.

In a seventh embodiment, a triangle parent-and-subsidiary flow-guided floating valve tray of this invention is applied to the rectifying tower similar to that of the second embodiment 2. As shown in FIG. 3, the parent valve A3 is a equilateral triangle 70 mm in edge length; the front leg A3-1 is 16 mm in length and 10 mm in width, while the rear leg A3-2 is 14 mm in length and 20 mm in width; the subsidiary valve B3 is also a equilateral triangle 30 mm in length; the front leg B3-1 is 8 mm in length and 6 mm in width, while the rear leg B3-2 is 7 mm in length and 10 mm in width. After modification, the operation flexibility of the rectifying tower reaches more than 5.3:1 and the production load increases by more than 52%.

In an eighth embodiment, with reference to FIG. 6, the round parent-and-subsidiary flow-guided floating valve tray of this invention is applied to the dichloromethane rectifying tower similar to that of the fourth embodiment 4. The original operation load is 30000 t/a and the tower diameter is 1600. The body of the parent floating valve A6 has a diameter of 50 mm and it has 3 legs: the front leg A6-1 is 8 mm in width and 14 mm in length, while the two rear legs A6-2 are 8 mm in width and 10 mm in length. The body of the subsidiary floating valve B6 has a diameter of 30 mm. The front leg B6-1 is 6 mm in width and 8 mm in length, while the rear leg B6-2 is 6 mm in width and 6 mm in length. The operation results after modification indicate that the operation flexibility increases from original 1.8:1 to 4.5:1, the production load increases by 38% and the pressure of the entire tower decreases 5800 Pa.

In a ninth embodiment, a diamond-shaped parent-and-subsidiary flow-guided floating valve tray of this invention is applied to the rectifying tower similar to that of the third embodiment. Modify type F1 floating valve tray, which has a diameter of 1800 mm with original production capacity of 40000 t/epoxy propane (PO). As shown in FIG. 1, the body of the parent floating valve of the diamond-shaped parent-and-subsidiary flow-guided floating valve A1 is 120 mm in length, 80 mm in front end length, 40 mm in rear end length and 55 mm in maximum width and the guide hole on the body of the parent valve A1-6 is shaped like a tongue 3 mm in height. The parent valve has 2 legs: the front leg A1-1 is 10 mm in width and 18 mm in length, while the rear leg A1-2 is 14 mm in width and 14 mm in length. The subsidiary valve B1 is a symmetrical quadrangle (trapezoidal) floating valve, 65 mm in valve leaf length, 43 mm in front end length, 22 mm in rear end length and 30 mm in maximum width. It has two legs: the front leg B1-1 is 8 mm in width and 8 mm in length, while the rear leg B1-2 is 10 mm in width and 7 mm in length. The operation results after modification indicate that the handling capacity of the rectifying tower reaches 63800 t/a, an increase of 59.5% than type F1 floating valve, the product quality reaches 99.92% and the backflow ratio decreases from original R=3.3 to R=3.1.

In a tenth embodiment, a trapezoidal parent-and-subsidiary flow-guided floating valve tray of this invention is applied to the rectifying tower similar to that of the first embodiment. As shown in FIG. 4, the body of the parent valve A4 is 80 mm in length, 30 mm in front end length, 60 mm in rear end length and the guide hole on the valve body A4-6 is shaped like a tongue 2 mm in height. The front leg A4-1 is 8 mm in width and 15 mm in length, while the rear leg A4-2 is 12 mm in width and 14 mm in length. The subsidiary valve B4 is an isosceles triangle, which are 35 mm in base edge length and 55 mm inside edge length. The base edge is parallel to the long base edge of the body of the parent valve. It has 3 legs: the front leg B4-1 is 5 mm in width and 7 mm in length, while the rear leg B4-2 is 6 mm in width and 6 mm in length. The operation results after modification indicate that the operation flexibility of the rectifying tower increases from original 2.5:1 to 6.5:1 and the operation load increases by 66.8%. Under same loads, the pressure of the whole tower decreases by 432 Pa.

In an eleventh embodiment, a streamline parent-and-subsidiary flow-guided floating valve tray of this invention is applied to the dichloromethane rectifying tower similar to that of the fourth embodiment. With original operation load of 60000 t/a and tower diameter=2200, the original tray is a type F1 floating valve. As shown in FIG. 2, the body of the parent valve A2 of the streamline parent-and-subsidiary flow-guided floating valve adopted is 70 mm in length, 50 mm in front end length, 20 mm in rear end length and 30 mm in maximum width. The guide hole on the body of the parent valve A2-6 is shaped like a tongue 2 mm in height. The parent valve has two legs: the front leg A2-1 is 6 mm in width and 14 mm in length, while the rear leg A2-2 is 8 mm in width and 13 mm in length. The subsidiary valve B2 has a streamline shape similar to that of the parent valve, is 35 mm in length, 25 mm in front end length, 10 mm in rear end length and 15 mm in maximum width. It also has 2 legs: the front leg B2-1 is 5 mm in width and 7 mm in length, while the rear leg B2-2 is 6 mm in width and 6 mm in length. The operation results after modification indicate that the operation load increases by 72%, the purity of product at the tower top increases from 99.95% wt to 99.97%, the tower temperature decreases by 6° C. and the operation flexibility changes from original 1.8:1 to 4.5:1.

In a twelfth embodiment, a diamond-shaped parent-and-subsidiary flow-guided floating valve tray of this invention is applied to the rectifying tower similar to that of the second embodiment two, which has a diameter=2800 and 90 sieve plates with plate-to-plate distance of 450 mm. As shown in FIG. 1, the body of the parent valve A1 of the diamond-shaped parent-and-subsidiary flow-guided floating valve is 110 mm in length, 75 mm in front end length, 35 mm in rear end length, 50 mm in maximum width and the guide hole on the body of the parent valve A1-6 is shaped like a tongue 2 mm in height. The front leg A1-1 is 10 mm in width and 17 mm in length, while the rear leg A1-2 is 14 mm in width and 15 mm in length. The subsidiary valve B1 is a symmetrical trapezoidal floating valve, which is 55 mm in valve leaf length; 38 mm in front end length, 17 mm in rear end length and 25 mm in maximum width. The subsidiary valve has 2 legs: the front leg B1-1 is 8 mm in width and 10 mm in length, while the rear leg B1-2 is 10 mm in width and 8 mm in length. The operation results after modification indicate that the maximum load of the tower increases from original 50000 t/a to 83000 t/a and the quality of the products is also improved.

In a thirteenth embodiment, a triangular parent-and-subsidiary flow-guided floating valve tray of this invention is modified into a normal pressure crude oil rectifying tower and the original tray is a type F1 floating valve tray with a diameter=3200 and plate-to-plate distance of 450 mm. As shown in FIG. 3, the parent valve A3 of the triangular parent-and-subsidiary flow-guided floating valve used is an equilateral triangle 60 mm in edge length and has 3 legs: the front leg A3-1 is 16 mm in length and 6 mm in width, while the two rear legs A3-2 are 14 mm in length and 6 mm in width. The subsidiary valve B3 also has an equilateral triangle 36 mm in edge length and 3 legs: the front leg B3-1 is 8 mm in length and 5 mm in width, while the 2 rear legs B3-2 are 7 mm in length and 5 mm in width. The operation results indicate that the handling capacity of the tower increases by 36.4%, the product yield of the side lines increases by 1.23%-3.45%. Under same handling capacity, the pressure of the whole tower drops by approximately 12%.

In a fourteenth embodiment, a round parent-and-subsidiary flow-guided floating valve tray of this invention is applied to the rectifying tower similar to that of embodiment thirteen. The original tray is a type F1 floating valve tray with a diameter=3000 and plate-to-plate distance of 450 mm. As shown in FIG. 6, the body of the parent valve A6 has a diameter of 60 mm and 3 legs: the front leg A6-1 is 5 mm in width and 13 mm in length and the 2 rear legs A6-2 are 5 mm in width and 12 mm in length. The body of the subsidiary valve B6 has a diameter of 36 mm and also has 3 legs: the front leg B6-1 is 4 mm in width and 7 mm in length, while the rear leg B6-2 is 4 mm in width and 6 mm in length. The operation results after modification indicate that the handling capacity of the tray increases by 28.8% than type F1 floating valve and the product's production rate of the sidelines increases by 2.2%-5.6%. Under the same handling quantity, the pressure of the whole tower decreases by approximately 8%.

In a fifteenth embodiment, a streamline parent-and-subsidiary flow-guided floating valve tray of this invention is applied to the rectifying tower similar to that of the second embodiment. The tower has a diameter=2600 and 90 sieve plates with plate-to-plate distance of 400 mm. As shown in FIG. 2, the body of the parent valve A2 is 100 mm; the parent valve is 65 mm in front end length, 35 mm in rear end length and 45 mm in maximum width and the guide hole on the valve body A2-6 is shaped like a tongue 2 mm in height. It has 2 legs: the front leg A2-1 is 10 mm in width and 15 mm in length, while the rear leg A2-2 is 12 mm in width and 13 mm in length. The subsidiary valve B2 has a streamline shape similar to that of the parent valve, is 60 mm in valve leaf length, 45 mm in front end length, 15 mm in rear end length and 25 mm in maximum width. It also has 2 legs: the front leg B2-1 is 6 mm in width and 7 mm in length, while the rear leg B2-2 is 8 mm in width and 6 mm in length. The operation results after modification indicate that the maximum load of the tower increases from original 45000 t/a to 80000 t/a and the product quality is also somewhat improved. Under the same load, the pressure of the whole tower decreases by approximately 36%.

In a sixteenth embodiment, a trapezoidal parent-and-subsidiary floating valve tray of this invention is applied to the dichloromethane rectifying tower similar to that of the fourth embodiment. With original operation load of 60000 t/a and tower diameter=2200, the original tray is a type F1 floating valve. As shown in FIG. 4, the body of the parent valve A4 used is 70 mm in length, 20 mm in front end length, 40 mm in rear end length and the guide hole on the body of the parent valve is shaped like a tongue 2 mm in height. The parent valve has 2 legs: the front leg A4-1 is 16 mm in width and 14 mm in length, while the rear leg A4-2 is 28 mm in width and 12 mm in length. The subsidiary valve B4 has a trapezoidal shape similar to that of the; the body of the subsidiary valve is 35 mm in length, 10 mm in front end width, 25 mm in rear end width; the subsidiary valve also has 2 legs: the front leg B4-1 is 6 mm in width and 7 mm in length, while the rear leg B4-2 is 10 mm in width and 6 mm in length. The operation results after modification indicate that the operation load increases by 56%, the purity of the product at the tower top increases from 99.95% wt to 99.98%, the tower temperature drops by 5° C. and the operation flexibility increases from original 1.8:1 to 4.2:1.

In a seventeenth embodiment, a rectangular (bar) parent-and-subsidiary flow-guided floating valve tray of this invention is applied to the rectifying tower similar to that described in embodiment one. With a diameter of 1600 mm, 40 layers of tray and hole rate of 12%, the original tray is a type F1 floating valve. As shown in FIG. 5, the body of the parent valve A5 is 80 mm in length and 40 mm in width; the parent valve has 2 legs: the front leg A5-1 is 12 mm in width and 14 mm in length, while the rear leg A5-2 is 12 mm in width and 12 mm in length. The body of the subsidiary valve B5 is 50 mm in length and 20 mm in width; the subsidiary valve also has 2 legs: the front leg B5-1 is 10 mm in width and 9 mm in length, while the rear leg B5-2 is 10 mm in width and 8 mm in length. The operation results after modification indicate that after using the diamond-shaped parent-and-subsidiary flow-guided floating valve tray of this invention, the purity of ethanol increases from 94.1% wt to 95.0% wt, indicating that the plate efficiency of the rectangular (bar) parent-and-subsidiary flow-guided floating valve tray increases significantly than type F1 floating type, the handling capacity increases by 52% and the production operation is stable. In addition, the operation flexibility increases from 2.3:1 prior to modification to 4.6:1, indicating that the parent-and-subsidiary flow-guided floating valve of this invention not only offers high throughput and efficiency, but also wide range of flexible operation.

In an eighteenth embodiment, a diamond-shaped parent-and-subsidiary flow-guided floating valve tray of this invention is applied to the normal pressure crude oil rectifying tower similar to that of the thirteenth embodiment. The original tray is a sieve plate with diameter=3200 and plate-to-plate distance of 450 mm. As shown in FIG. 1, the body of the parent valve A1 is 80 mm in length, 30 mm in front end length and 50 mm in rear end length. No guide hole is provided on the valve body. The parent valve has 2 legs: the front leg A1-1 is 10 mm in width and 15 mm in length, while the rear leg A1-2 is 12 mm in width and 13 mm in length. The subsidiary valve B1 is a symmetrical trapezoidal floating valve, 50 mm in valve leaf length; 15 mm in front end width and 28 mm in rear end length. The subsidiary valve also has 2 legs: the front leg B1-1 is 10 mm in width and 10 mm in length, while the rear leg B1-2 is 12 mm in width and 8 mm in length. The operation results after modification indicate that the handling capacity of the tray of this invention increases by 38.8% than the original sieve plate tower, the product's production rate of the sidelines increases from by 2.6%-7.6%. And, under the same handling capacity, the pressure of the whole tower decreases by more than 12%.

In a nineteenth embodiment, a trapezoidal parent-and-subsidiary flow-guided floating valve tray of the invention is applied to the dichloromethane (chloroform) rectifying tower. With operation load of 30000 t/a and tower diameter=1600, the original tray is a type F1 floating valve with 180 plates and plate-to-plate distance of 400 mm. As shown in FIG. 4, the body of the parent valve A4 used upon modification is 90 mm in length, 30 mm in front end width, 50 mm in rear end width and the guide hole on the body of the parent valve A4-6 is shaped like a tongue 2 mm in height. The parent valve has 2 legs: the front leg A4-1 is 16 mm in width and 14 mm in length, while the rear leg A4-2 is 20 mm in width and 12 mm in length. The subsidiary valve B4 has a trapezoidal similar to that of the parent valve, is 45 mm in valve leaf length, 15 mm in front end length and 25 mm in rear end length. The subsidiary valve also has 2 legs: the front leg B4-1 is 10 mm in width and 7 mm in length, while the rear leg B4-2 is 12 mm in width and 6 mm in length. The operation results after modification indicate that the operation load increases by 48%, the purity of the product at the tower top increases from original 99.94% wt to 99.98%, the tower temperature drops by 5° C. and the operation flexibility increases from original 2.1:1 to 4.6:1.

In a twentieth embodiment, a streamline parent-and-subsidiary flow-guided floating valve tray of this invention is applied to the rectifying tower similar to that of the third embodiment. The original tray is a type F1 floating valve tray, with diameter Φ=1800 mm, 56 plates and plate-to-plate distance of 400 mm and is made of stainless steel. As shown in FIG. 2, the body of the parent valve A2 is 80 mm in length and 40 mm in maximum width. There is no guide hole on the body of the subsidiary valve. The front leg of the parent valve A2-1 is 8 mm in width and 15 mm in length, while the rear leg A2-2 is 10 mm in width and 13 mm in length. The subsidiary valve B2 has a streamline shape similar to that of the parent valve, is 48 mm in length and 20 mm in maximum width. The front leg of the subsidiary valve is 6 mm in width and 7 mm in width, while the rear leg B2-2 is 8 mm in width and 6 mm in length. The operation results after modification indicate that the handling capacity of the rectifying tower increases by 47.2% than before modification, the product quality (PO purity) reaches 99.93% and the backflow ratio decreases from R=3.3 to R=3.15. Under the same handling quantity, the pressure of the whole tower drops by 612 Pa.

We claim:

1. A parent-and-subsidiary flow-guided floating valve, comprising:
   a parent valve having a body being a symmetrical planar figure with a central axis line as a symmetrical line, the central axis line pointing to an overflow cofferdam along a direction in which a liquid flows;
   at least two legs below the body of the parent valve, with a front leg being longer than a rear leg so that a 2-10 degree angle opens between the body of the parent valve;
   a valve orifice toward the overflow cofferdam when the parent valve is fully open, wherein the body of the parent valve includes a parent valve hole;
   a subsidiary valve positioned above the parent valve hole, the subsidiary valve being a movable valve having a body, the body of the subsidiary valve having an area 30% to 60% of the area of the body of the parent valve; and
   a guide hole positioned on the body of the parent valve, wherein a guide plate is located on the guide hole, further wherein the guide hole is shaped like a tongue, rising 2 mm in height from the body of the parent valve, and fixed at one end of the guide hole;

wherein at least two subsidiary legs under the body of the subsidiary valve have a front leg being longer than a rear leg so that a 0-10 degree angle opens between the body of the subsidiary valve and the body of the parent valve toward the overflow cofferdam when the subsidiary valve is fully open;

wherein the body of the parent valve has a length of 70 mm and a maximum width of 30 mm;

wherein the front leg of the parent valve is 14 mm in length and the rear leg of the parent valve is 13 mm in length;

wherein the body of the subsidiary valve has the same shape as the body of the parent valve, and has a length of 35 mm and a maximum width of 15 mm;

wherein the front leg of the subsidiary valve is 7 mm in length and the rear leg of the subsidiary valve is 6 mm in length.

2. The parent-and-subsidiary flow-guided floating valve of claim 1, wherein a polygon top angle of the body of the parent valve and the body of the subsidiary valve is an arc so that the body of the parent valve and the body of the subsidiary valve form a streamline shape along the direction in which the liquid flows.

3. A parent-and-subsidiary flow-guided floating valve, comprising:

a parent valve having a streamline shaped body being a symmetrical planar figure with a central axis line as a symmetrical line, the central axis line pointing to an overflow cofferdam along a direction in which a liquid flows, wherein the parent valve has at least two legs, the at least two legs include a front leg and a rear leg, the front leg being longer than the rear leg so that a 0 to 10 degree angle opens between the body of the parent valve;

a guide opening on the streamline shaped body of the parent valve out of which guided air flows in the same direction as the liquid flow to drive forward accelerated flow of the liquid to reduce a liquid surface gradient on a tower, wherein the guide opening has a guide plate located thereon, the guide plate raised 2 mm above the parent valve and fixed at one end of the guide opening;

a valve orifice toward the overflow cofferdam when the parent valve is fully open, wherein parent valve includes a parent valve hole; and a subsidiary valve having a streamline shaped subsidiary body, the subsidiary valve positioned above the parent valve hole proximate the parent valve, the subsidiary valve being a movable valve, the streamline shaped subsidiary body having an area 30% to 60% of the parent valve;

wherein the subsidiary valve has at least two subsidiary legs, the at least two subsidiary legs include a front subsidiary leg and a rear subsidiary leg, the front subsidiary leg being longer than the rear subsidiary leg so that a 0-10 degree angle opens between the subsidiary valve and the parent valve toward the overflow cofferdam when the subsidiary valve is fully open;

wherein the streamline shaped body of the parent valve has a maximum length of 100 mm and a maximum width of 45 mm;

wherein the front leg of the parent valve is 14 mm in length and the rear leg of the parent valve is 11 mm in length;

wherein the streamline shaped body of the subsidiary valve is the same as the streamline shaped body of the parent valve, further wherein the streamlined shaped body of the subsidiary valve has a maximum length of 60 mm and a maximum width of 25 mm;

wherein the front leg of the subsidiary valve is 7 mm in length and the rear leg of the subsidiary valve is 6 mm in length.

4. The parent-and-subsidiary flow-guided floating valve of claim 3, wherein a polygon top angle of the parent valve and the subsidiary valve is an arc so that the parent valve and the subsidiary valve form a streamlined shape along the direction in which the liquid flows.

* * * * *